(12) United States Patent
Omote et al.

(10) Patent No.: US 8,018,645 B2
(45) Date of Patent: *Sep. 13, 2011

(54) DISPLAY-PROTECTIVE PLATE FOR ELECTRONIC APPARATUS AND ELECTRONIC APPARATUS THEREWITH

(75) Inventors: Ryoumei Omote, Kyoto (JP); Takayuki Takagi, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/668,527

(22) PCT Filed: Jul. 7, 2008

(86) PCT No.: PCT/JP2008/062271
§ 371 (c)(1),
(2), (4) Date: Jan. 11, 2010

(87) PCT Pub. No.: WO2009/008402
PCT Pub. Date: Jan. 15, 2009

(65) Prior Publication Data
US 2010/0208333 A1    Aug. 19, 2010

(30) Foreign Application Priority Data
Jul. 11, 2007    (JP) .................................. 2007-181959

(51) Int. Cl.
*G02F 1/29* (2006.01)
(52) U.S. Cl. .......................................... 359/320
(58) Field of Classification Search .................. 359/320, 359/359, 360, 584, 585, 589, 883, 884, 253, 359/614; 428/213; 349/193, 196
See application file for complete search history.

(56) References Cited

U.S. PATENT DOCUMENTS

| 2005/0057171 A1* | 3/2005 | Sakurada et al. | .......... 315/169.1 |
| 2010/0128204 A1* | 5/2010 | Omote et al. | .................... 349/86 |

FOREIGN PATENT DOCUMENTS

| JP | 2002-333610 | 11/2002 |
| JP | 2003-140149 | 5/2003 |
| JP | 2003-140558 | 5/2003 |
| JP | 2004-37943 | 2/2004 |
| JP | 2004-258228 | 9/2004 |

OTHER PUBLICATIONS

International Search Report issued Aug. 26, 2008 in International (PCT) Application No. PCT/JP2008/062271.

(Continued)

*Primary Examiner* — William Choi
*Assistant Examiner* — Tuyen Tra
(74) *Attorney, Agent, or Firm* — Wenderoth, Lind, Ponack, L.L.P.

(57) ABSTRACT

A display-protective plate for an electronic apparatus, is attached to a case 7 of an electronic apparatus 1 to be used, and protects a display surface of a display 4 that is attached so as to be exposed from the case 7 of the electronic apparatus 1. The protective plate is configured by a plate-shaped transparent base member 11, a color half mirror layer 12 placed on a lower side of the transparent base member, a transparency-switching film 13 formed on a lower face of the color half mirror layer 12, for switching between transmitting and non-transmitting modes, a reflection-increasing film layer 20 placed on a lower face of the transparency-switching film 13, and a backing layer 14 formed on a lower face of the reflection-increasing film layer 20 and located on a portion except for an exposed portion of the display, which are successively laminated.

8 Claims, 5 Drawing Sheets

OTHER PUBLICATIONS

Patent Cooperation Treaty (PCT) International Preliminary Report on Patentability issued Apr. 13, 2010 in corresponding International Application No. PCT/JP2008/062271.

Supplementary European Search Report (in English language) issued Nov. 24, 2010 in corresponding European Patent Application No. 08 79 0932.

* cited by examiner

DISPLAY-PROTECTIVE PLATE FOR ELECTRONIC APPARATUS AND ELECTRONIC APPARATUS THEREWITH

BACKGROUND OF THE INVENTION

1. Technical Field

The present invention relates to a display-protective plate for an electronic apparatus that is attached to a case of an electronic apparatus having a display such as a liquid crystal display so as to protect a display surface of the display, and also add a special designing effect thereto, and also relates to an electronic apparatus having such a protective plate.

2. Description of Related Art

An electronic apparatus having a small-size display device, such as a portable telephone or a portable information terminal (PDA) like an electronic notebook, uses a flat panel display, such as a liquid crystal display, an organic EL display, an electric field discharge-type display, or a plasma display, as its display device.

In order to protect the display surface of this display, a protective plate made from a plastic material, glass, or the like is bonded to the case of an electronic apparatus so as to prevent the display surface of the display from being exposed.

This protective plate is used not only for protecting the display surface of the display, but also for imparting a designing effect to the electronic apparatus. In particular, in recent years, there have been strong demands for electronic apparatuses having special designing features such as metallic gloss, and a protective plate or the like to which a special designing feature is added as a whole, without causing degradation of displaying performance of the display, has been disclosed.

For example, Patent Document 1 has disclosed a protective plate for a portable display device in which a scattering preventive coat film is attached to one of surfaces of a reinforcing glass plate, with a film with characters or a pattern printed thereon being attached to the same surface. Here, in this protective plate, the film is a so-called frame-shaped member that has characters or a pattern printed only on the film base portion, with its center portion being bored, and a double-sided tape used for bonding the glass plate and the film to each other is also made of a frame-shaped member having the same shape as the film. Since the film is molded into a shape having the bored portion in the center, the display is easily viewed through a portion other than the printed portion having the frame shape.

Patent Document 1: JP-A No. 2003-140558

SUMMARY OF THE INVENTION

Issues to be Solved by the Invention

In this case, however, since the pattern concealing the periphery of the transparent window portion, disclosed in Patent Document 1, is formed by printing, the pattern has a low reflective property, and is poor in high-quality designing effect. Here, in the case when, upon printing, an aluminum vapor deposition film is formed, the reflectance can be improved slightly; however, this method also fails to provide a sufficient high-quality designing effect.

Moreover, in the center portion where the display is placed, no film is attached thereto, with the result that no decoration is placed to cause a limitation in designing. That is, since the display is always visible from the outside regardless of the use or no use of the electronic apparatus, it gives influences on the designing effect of the surface of the electronic apparatus.

Furthermore, the display to be attached to an electronic apparatus is normally set to a so-called stand-by state with no screen display when not used, so as to reduce power consumption. At this time, when the portion covering the display has a transmitting property as described above, the display with no screen display in its stand-by state is always visible from the outside. This state is not desirable for the electronic apparatus from the designing viewpoint, and, for example, it is not possible to make the outside appearance different depending on the power-off state and the stand-by state of the electronic apparatus.

Therefore, a technical object to be achieved by the present invention is to provide a protective plate that can ensure sufficient visibility of a display, and has a superior designing effect, and an electronic apparatus using such a protective plate.

Mean for Solving the Issues

In order to achieve the above-mentioned technical object, the present invention provides a display-protective plate for an electronic apparatus and an electronic apparatus using the same, which have the following structures.

According to a first aspect of the present invention, there is provided a display-protective plate for an electronic apparatus, which is attached to a case of an electronic apparatus to be used, and protects a display surface of a display that is attached to the case so as to be exposed from the case of the electronic apparatus, comprising:

a plate-shaped transparent base member;

a color half mirror layer that is placed on a lower side of the transparent base member, and made of a tint-treated metal thin film;

a transparency-switching film that is placed on a lower face of the color half mirror layer, for switching between transmitting and non-transmitting modes electrically;

a transparent reflection-increasing film layer that is placed on a lower face of the transparency-switching film, and is a composite film formed by alternately laminating high refractive-index films and low refractive-index films; and a backing layer that is formed on a lower face of the reflection-increasing film layer in a tightly contact state without having an air layer interposed therebetween, and located on a portion except for an exposed portion of the display, which are successively laminated.

According to a second aspect of the present invention, there is provided the display-protective plate for an electronic apparatus according to the first aspect, wherein the transparency-switching film is formed by a polymer dispersion-type liquid crystal film and adapted to be capable of switching between transparent and white non-transparent modes upon application of a voltage.

According to a third aspect of the present invention, there is provided the display-protective plate for an electronic apparatus according to the second aspect, wherein the transparency-switching film becomes the white non-transparent mode when a voltage is applied thereto, and becomes the transparent mode when no voltage is applied thereto.

According to a fourth aspect of the present invention, there is provided the display-protective plate for an electronic apparatus according to the first aspect, wherein the reflection-increasing film layer is made of a layer on which a dielectric film made from a transparent inorganic oxide is laminated.

According to a fifth aspect of the present invention, there is provided the display-protective plate for an electronic apparatus according to the first aspect, wherein, in place of the tint-treated metal thin film, the color half mirror layer is made of another tint-treated reflection-increasing film.

According to a sixth aspect of the present invention, there is provided the display-protective plate for an electronic apparatus according to the first aspect, wherein the color half mirror layer is placed on a surface of a transparent film, and formed by bonding the transparent film and the transparent base member to each other, with a surface of the film on which the color half mirror layer is not formed being made tightly in contact with a surface of the transparent base member.

According to a seventh aspect of the present invention, there is provided the display-protective plate for an electronic apparatus according to the first aspect, wherein the backing layer is made of a black solid pattern.

According to an eighth aspect of the present invention, there is provided an electronic apparatus having a case with a surface to which the display-protective plate according to the first aspect is attached, comprising:

a film-state switching unit for switching between the transmitting and non-transmitting modes of the transparency-switching film;

a display control unit for controlling a display state of the display; and a main control unit for making operations of the display control unit and the film-state switching unit different depending on a state of the electronic apparatus, wherein the protective plate is allowed to have a different design depending on a state of the electronic apparatus.

Effects of the Invention

In accordance with the present invention, by switching between transmitting and non-transmitting modes of the transparency-switching film formed on the lower face of the color half mirror layer, the exposed state and the concealed state of the reflection-increasing film layer and the backing layer that are formed beneath the transparency-switching film as well as the display can be switched. That is, in the case when the transparency-switching film is in the non-transmitting mode, since light, made incident thereon from outside, is reflected by the surface of the transparency-switching film, the reflection-increasing film and the backing layer are concealed from the outside, and are not visually recognized. As a result, the outside appearance of the electronic apparatus is derived from the color half mirror layer. In contrast, in the case when the transparency-switching film is in the transmitting mode, the reflection-increasing film layer and the backing layer located beneath the transparency-switching film are visually recognized, and as a result, the outside appearance becomes a half mirror state derived from the reflection-increasing film layer and the backing layer. At this time, a decorative mode, exerted by the reflection-increasing film layer and the backing layer, may be prepared as a hue different from the tint of the color half mirror layer. In this case, the transparency-switching film is set to the transmitting mode, and the outside appearance of the electronic apparatus has a mixed color tone, with the two color tones being mixed with each other. Therefore, by switching between transmitting and non-transmitting modes of the transparency-switching film, the appearance of the color half mirror layer can be made different so that it is possible to provide the protective plate that is superior in designing.

Moreover, when the transparency-switching film is made of a polymer dispersion-type liquid crystal film, it becomes possible to easily switch between the transmitting and non-transmitting modes. Furthermore, since the display can be concealed by bringing the film into the non-transmitting mode when no voltage is applied thereto, it becomes possible to reduce power consumption during the stand-by state and the power-off state.

In an electronic apparatus with a case having a surface to which the protective plate is attached, designs of the protective plate may be varied, for example, depending on the states of the electronic apparatus, such as a power-off state, a stand-by state, and a screen-displayed state. Therefore, by observing the state of the protective plate, the state of the electronic apparatus can be distinguished at a glance.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
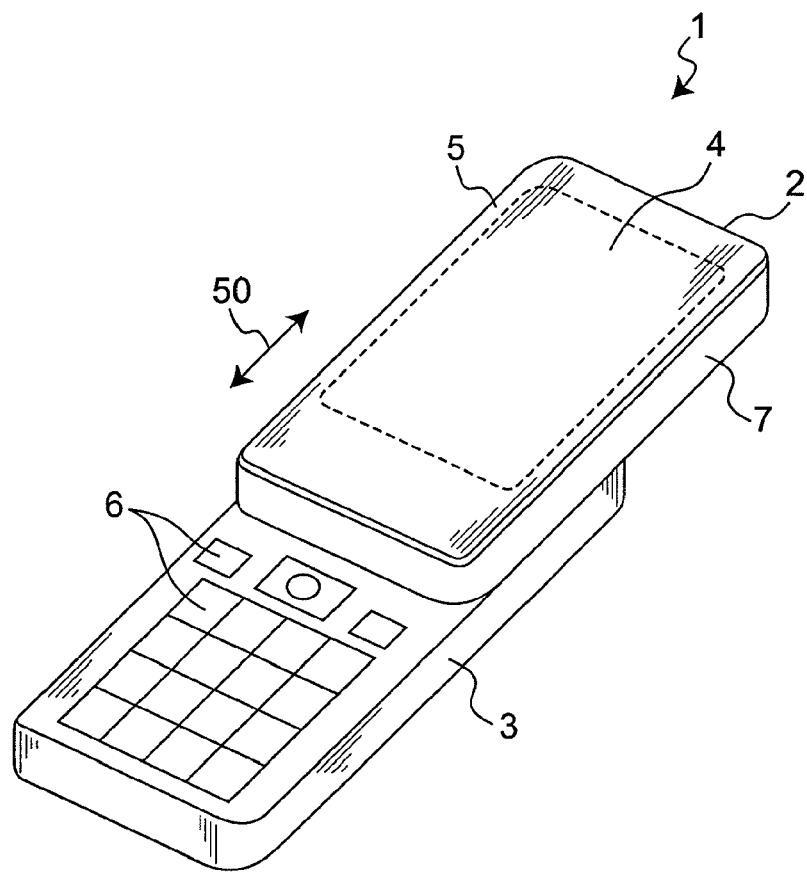
FIG. 1 is an outside structural view that shows a portable telephone terminal on which a display-protective plate for an electronic apparatus in accordance with one embodiment of the present invention is mounted.

Referring to the drawings, the following description will discuss a portable telephone terminal on which a display-protective plate for an electronic apparatus in accordance with one embodiment of the present invention is mounted.

Figure 2:
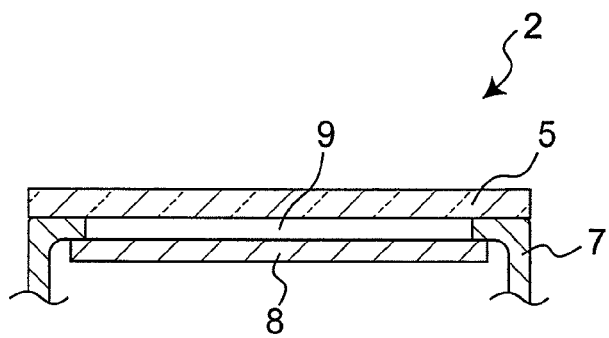
FIG. 2 is a cross-sectional view that shows an upper-side main body of the portable telephone terminal of FIG. 1.

FIG. 1 is an outside structural view that shows a portable telephone terminal on which a display-protective plate for an electronic apparatus in accordance with the one embodiment of the present invention is mounted, and FIG. 2 is a cross-sectional view that shows an upper-side main body of the portable telephone terminal of FIG. 1. A portable telephone terminal 1 is provided with an upper-side main body 2 and a lower-side main body 3, and the upper-side main body 2 is allowed to slide relative to the lower-side main body 3 as indicated by an arrow 50 so that the open/close states of the lower-side main body 3 can be switched.

A liquid crystal display 4 is installed on the upper-side main body 2, and a protective plate 5 is bonded to the entire surface of a case 7 so as to protect the liquid crystal display 4. The case 7 of the upper-side main body 2 is formed into a box shape, and a liquid crystal display panel 8 is housed therein. The liquid crystal display panel 8 has its portion exposed from an opening 9 of the case, which forms the display 4 that is visually recognizable from the outside. The liquid crystal display panel 8 is made of a normally black liquid crystal panel that looks black in a non-display state.

The protective plate 5 is attached to the surface of the case 7 to cover the entire case so that it protects the display 4, and also imparts a designing effect to the upper-side main body 2. Here, in FIG. 2, there is an air layer 9 between the surface of the liquid crystal display panel 8 and the protective plate 5; however, this air layer is not necessarily required to be formed.

Moreover, operation buttons 6 are provided at the lower-side main body 3, and in its open state, these are exposed to the outside to be made operable for inputting processes. That is, the upper-side main body 2 also functions as a protective member for the operation buttons 6 on the lower-side main body.

When the upper-side main body 2 is in its closed state, that is, when the operation buttons 6 on the lower-side main body are covered, and are not used for inputting processes, the portable telephone terminal is set to a stand-by state. Moreover, when the upper-side main body 2 is in its open state, that is, the operation buttons 6 are exposed and can be used for the inputting processes, the portable telephone terminal 1 is set to a usable state, and the corresponding state and the like are displayed on the display 4. Therefore, the protective plate 5, used for covering the surface of the upper-side main body 2, is allowed to have an outside appearance corresponding to the displayed state of the display 4 that is changed depending on the state of the portable telephone terminal.

Figure 3A:
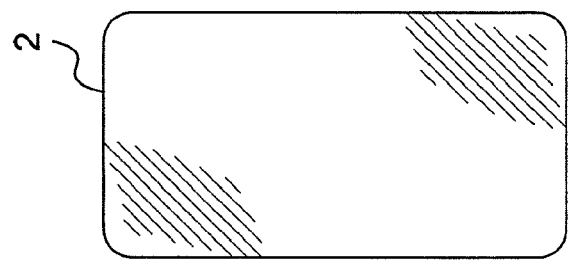
FIG. 3A is a view that shows an example of a display state in which reflective gloss of the upper-side main body of the portable telephone terminal of FIG. 1 is emphasized.
Figure 3B:
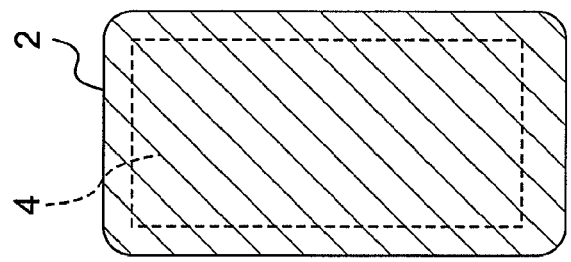
FIG. 3B is a view that shows an example of a display state in which the surface of the upper-side main body of the portable telephone terminal of FIG. 1 exhibits an outside appearance like a color half mirror, with a display being in a light-off state.
Figure 3C:
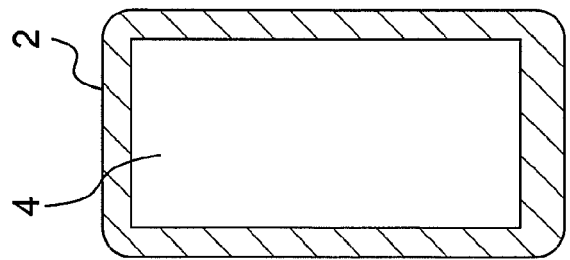
FIG. 3C is a view that shows an example of a display state in which the surface of the upper-side main body of the portable telephone terminal of FIG. 1 exhibits an outside appearance like a color half mirror, with the display being in a displayed state.

In the present embodiment, the display mode of the upper-side main body 2 of the portable telephone terminal can be switched among three display designs shown in FIGS. 3A to 3C. In a mode shown in FIG. 3A, the entire surface of the upper-side main body 2 is in a decorated state with an emphasized reflective gloss so that the display 4, covered with the protective plate 5, is not visually recognizable. This state is a state where, since a polymer dispersion-type liquid crystal film 13, located beneath a color half mirror layer, which will be described later, is in a non-transmitting mode, reflection of the color half mirror layer located thereon is emphasized. In a mode shown in FIG. 3B, the entire surface of the upper-side main body 2 exhibits an outside appearance like a color half mirror, with the presence of the display 4 being visually recognized very faintly. This state is a state where, since the polymer dispersion-type liquid crystal film 13 located beneath the color half mirror layer is transparent, a reflection-increasing film layer and a backing layer, located beneath the film, become more recognizable from the surface, rather than the reflection of the color half mirror layer, with its color standing out on the surface. In a mode shown in FIG. 3C, the entire surface of the upper-side main body exhibits an outside appearance like a color half mirror, with the display 4 being in its displayed state. This state is a decorated state where, as described above, the reflection-increasing film layer and the backing layer, located beneath the color half mirror layer, are recognizable from the surface, with the display 4 being in the displayed state. The portable telephone terminal relating to the present embodiment makes it possible to switch among these states by having the following structure.

Figure 4:
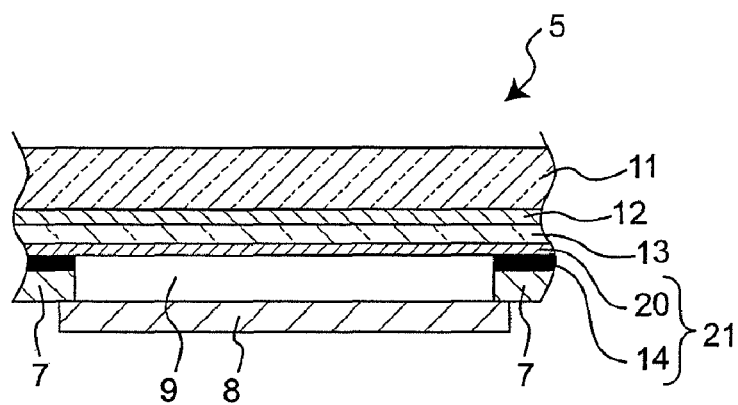
FIG. 4 is a schematic view that shows a cross-sectional structure of the protective plate in accordance with the present embodiment.
Figure 5:
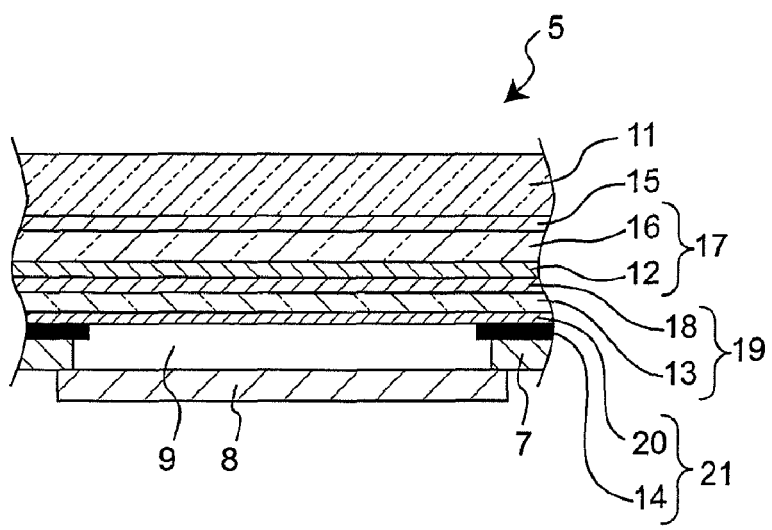
FIG. 5 is a schematic view that shows a modified example of a cross-sectional structure of the protective plate in accordance with the present embodiment.

FIG. 4 is a schematic view that shows a cross-sectional structure of the protective plate relating to the present embodiment. FIG. 5 is a schematic view that shows a modified example of a cross-sectional structure of the protective plate relating to the present embodiment. The protective plate 5 is configured by successively laminating a plate-shaped transparent base member 11, a color half mirror layer 12, placed on the lower side of the transparent base member 11, that is made of a metal thin film subjected to a tint treatment, the polymer dispersion-type liquid crystal film 13, formed on the lower face of the color half mirror layer 12, that is one example of a transparency-switching film capable of switching between transmitting and non-transmitting modes, a transparent reflection-increasing film layer 20, formed on the lower face of the polymer dispersion-type liquid crystal film 13, that is a composite film formed by alternately laminating high refractive-index films and low refractive-index films, and a backing layer 14 that is formed on a portion of the display panel 8 except for the exposed portion thereof, with being made in tightly contact, with the lower face of the reflection-increasing film layer without having an air layer interposed therebetween.

Here, FIG. 4 shows an example in which the polymer dispersion-type liquid crystal film 13 with the half color mirror layer 12 directly affixed thereto is attached onto the surface of the transparent base member 11 with a transparent bonding agent (not shown), and FIG. 5 shows an example in which the transparent base member 11, a half mirror film with a half mirror layer affixed onto the surface thereof, and an adhesive film formed by applying a transparent bonding agent to the surface of a polymer dispersion-type liquid crystal film are mutually bonded one after another.

The transparent base member 11 is a plate-shaped member that is superior in transparency and capable of protecting the display from damage. A desired pattern may be affixed onto the surface of the transparent base member 11. The transparent base member 11 is made from a synthetic resin or reinforced glass or the like. Examples of the synthetic resin include: general-purpose resins, such as a polystyrene-based resin, a polyolefin-based resin, an ABS resin, an AS resin, an acrylic-based resin, and an AN resin. Moreover, the examples further include: general purpose engineering resins, such as a polyphenylene oxide-polystyrene-based resin, a polycarbonate-based resin, a polyacetal-based resin, a polycarbonate-modified polyphenylene ether resin, a polybutylene terephthalate resin and an ultra-high molecular weight polyethylene resin, and super engineering resins, such as a polysulfone resin, a polyphenylene sulfide-based resin, a polyphenylene oxide-based resin, a polyallylate resin, a polyether imide resin, a polyimide resin, a liquid crystal polyester resin, and a polyallyl-based heat resistant resin. Although the transparent base member 11 is a plate-shaped member, the plate-shaped member is not limited to a flat plate as illustrated, but includes a thin molded product having a curved face.

Moreover, in a case of using reinforced glass as the transparent base member 11, although the material is not particularly limited, rather than generally-used so-called blue glass, white soda glass (so-called white glass) that is further superior in mechanical strength and the like may be preferably used. With respect to the method for manufacturing reinforced glass (the method for a reinforcing process), although not particularly limited, normally a reinforcing method by the use of ion exchange is preferably used since a glass plate having a thickness of about 1 mm is used in most cases. The chemically reinforced glass, reinforced through ion exchange, is allowed to exhibit a greater compression stress in comparison with wind-cooled reinforced glass, as described earlier.

Although not particularly limited, the thickness of the transparent base member 11 is preferably set in a range of from about 0.3 to 1.1 mm, more preferably, from 0.5 to 0.8 mm, from the viewpoint of achieving light weight while maintaining sufficient strength.

The color half mirror layer 12 is arranged on the surface of the polymer dispersion-type liquid crystal film 13, and bonded to the back surface of the transparent base member 11 by using a bonding agent or the like. As shown in FIG. 4, it may be directly arranged on the surface of the polymer dispersion-type liquid crystal film 13, or as shown in FIG. 5, a half mirror film 17, formed by affixing the color half mirror layer 12 to the back face of a transparent film 16 formed separately from the polymer dispersion-type liquid crystal film 13, may be arranged so as to be bonded to the polymer dispersion-type liquid crystal film 13 with a transparent bonding agent 18. Here, the transparent film 16 and the color half mirror layer 12 may be switched with each other in their order of laminations.

Examples of the transparent film 16 forming the half mirror film 17 include engineering plastic materials, such as polycarbonate-based, polyamide-based and polyether ketone-based plastic materials, and resins, such as acryl-based, polyethylene terephthalate-based and polybutylene terephthalate-based resins.

The color half mirror layer 12 is made of a metal thin film that is subjected to a tint treatment. The term "tint" means a transparent color ink that is exemplified as a pigment ink or a dye ink having an extremely low density. Specific examples of the tint treatment include a method in which a metal thin film such as aluminum, chromium, tin or indium is formed on the surface of the polymer dispersion-type liquid crystal film 13 by means of vapor deposition or the like, when a pigment having an extremely low density is applied thereon through a gravure printing method as its tint treatment. Moreover, a metal thin film layer is formed on the surface of the transparent film 16, and a gravure printing process may be carried out thereon. In still another tint treatment, a colored transparent resin film may be used as the transparent film 16. In this case, the colored transparent resin film having a desired tint to be applied may be used. For example, a yellow-colored transparent film 16 may be combined with a metal thin film having silver gloss to provide a surface gloss with a gold color.

The metal thin film may be formed by using, for example, a vacuum vapor deposition method, a sputtering method, a CVD method, a roll coater method or the like. Here, the metal thin film is preferably formed to have such a film thickness that, although the metal thin film conceals the display in a light-off state, it allows displayed information in a light display state to transmit. The metal thin film is preferably formed so as to have a light transmittance in a range of from 60 to 80%.

Figure 6A:
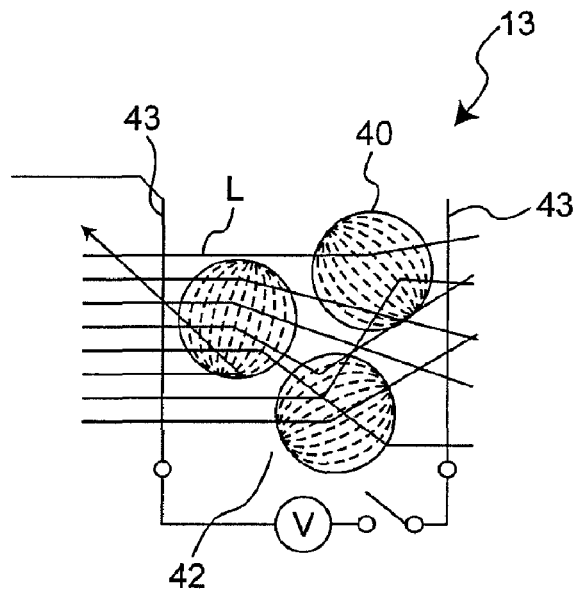
FIG. 6A is a view that shows a state of a polymer dispersion-type liquid crystal film, with no voltage being applied thereto.
Figure 6B:
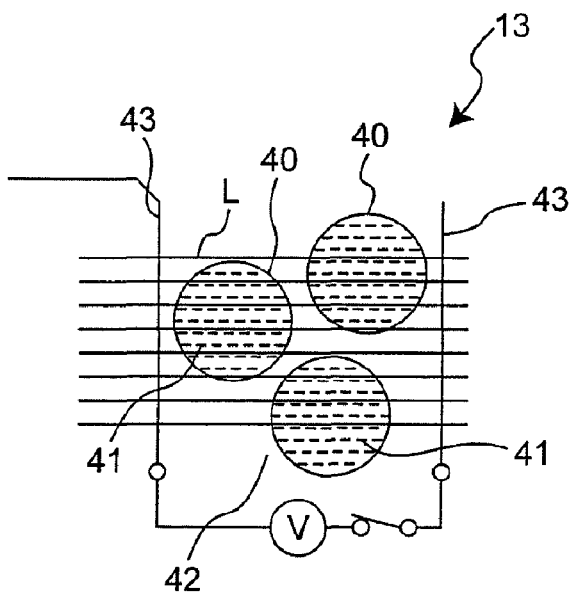
FIG. 6B is a view that shows a state of the polymer dispersion-type liquid crystal film, with a voltage being applied thereto.

The polymer dispersion-type liquid crystal film 13 is a film capable of switching between non-transmitting and transmitting states depending on the presence and absence of a voltage application, and its degree of transmittance can be freely changed by changing the voltage to be applied. As shown in FIGS. 6A and 6B, the polymer dispersion-type liquid crystal film 13 has a structure in which a transparent polymer film 42 formed by dispersing capsules 40 of nematic liquid crystal 41 therein is sandwiched between two sheets of films 43, each having a transparent conductive film affixed thereto.

The polymer dispersion-type liquid crystal film 13, which is used as an adhesive film 19 formed by applying a transparent bonding agent 18 to the surface of a film having the above-mentioned structure, is attached onto the surface of the half mirror film 17.

As shown in FIG. 6A, in a state with no voltage applied thereto, since the liquid crystal 41 having rod-shaped molecules are aligned along the inner wall of each capsule 40, light L, made incident on the film, is refracted in the surface and the inside of the capsule 40 by a difference in refractive indexes of the polymer and the liquid crystal and by birefringence of the liquid crystal. As a result, the light L is not allowed to progress straight and is scattered so that the film looks white.

In contrast, as shown in FIG. 6B, upon application of a voltage, since the liquid crystal molecules 41 behave so as to be aligned in the direction in which the voltage is applied, the liquid crystal molecules 41 are aligned perpendicularly to the electrodes. In this state, the capsules 40 are brought into a state equivalent to a no-interface state, and the light L, made incident thereon, is allowed to progress straight without being scattered. As a result, the film looks transparent.

The reflection-increasing film layer 20 is made of a transparent reflection-increasing film. More specifically, this is made of a composite film in which high refractive-index films and low refractive-index films are alternately laminated. This composite film increases reflection of light having a specific wavelength by interference of light rays occurring on the interface between the high refractive-index film and the low refractive-index film. When the reflection-increasing film layer 20 is made to have high reflection of 60% or more, it becomes possible to apply a tint. With respect to the combination between the high refractive-index film and the low refractive-index film, for example, a combination between a $TiO_2$ film and a $SiO_2$ film, or the like is preferably used. Moreover, the composite film is formed into a structure with three layers to ten layers on demand, with each layer being set to 100 nm or less, based upon a tint to be applied. The method for forming the composite film includes an EB vapor deposition method, a sputtering method and the like.

The backing layer is preferably formed so as to be made tightly in contact with the lower face of the reflection-increasing film layer 20, with no air layer being interposed therebetween. In the case when an air layer is interposed, reflection occurs on the interface, with the result that the backing layer portion tends to look white.

The backing layer 14 is made of a solid pattern. In the present embodiment, a black-colored solid pattern is adopted so as to match the color of the liquid crystal display panel 8 in the light-off state. By allowing the color of the liquid crystal display panel in the light-off state and the color of the backing layer 14 to match each other, the border between the portion of the backing layer 14 and the exposed portion of the display 4 can be made hardly recognizable visually in the light-off state of the liquid crystal display panel 8.

The polymer dispersion-type liquid crystal film 13 can make different the color of the protective plate 5 that is visually recognized through the half mirror layer 12 by a shutter effect. That is, when the polymer dispersion-type liquid crystal film 13 is in the non-transmitting mode, the light that has reached the polymer dispersion-type liquid crystal film 13 is reflected by the white polymer dispersion-type liquid crystal film 13 so that the color half mirror layer 12 on the white background is viewed. In contrast, in the case when the polymer dispersion-type liquid crystal film 13 is in the transmitting mode, since the polymer dispersion-type liquid crystal film 13 is transparent, the light, made incident thereon, is allowed to transmit the color half mirror layer 12 and the polymer dispersion-type liquid crystal film 13 so that colored reflected light from the reflection-increasing film layer 20 with the backing layer-formed is visually recognized. By varying the decorative reflection colors formed by the color half mirror layer 12 and the reflection-increasing film layer and the backing layer 14, the colors of the two layers may be mixed to form another color tone, and consequently, variations of various colors can be obtained.

That is, the portable telephone terminal 1 on which the display-protective plate for an electronic apparatus in accordance with the present embodiment is mounted is capable of switching between the modes shown in FIGS. 3A, 3B, and 3C in its designing effect given by the protective plate 5 as explained above, by switching between the displayed states of the liquid crystal display, as well as between transmitting and non-transmitting modes of the polymer dispersion-type liquid crystal film 13.

That is, in a state shown in FIG. 3A, by bringing the polymer dispersion-type liquid crystal film 13 into the non-transmitting mode while the liquid crystal display 8 is off, the color half mirror layer 12 is visually recognized on the white background so that a mirror state having reflective gloss, colored by the color half mirror layer 12, is prepared over the entire portion. In a state shown in FIG. 3B, by bringing the polymer dispersion-type liquid crystal film 13 into the transmitting mode while the liquid crystal display 8 is off, an outside appearance of the half mirror on the background of colors formed by the reflection-increasing film layer 20 and the backing layer 14 is prepared.

The portable telephone terminal 1 on which the display-protective plate for an electronic apparatus in accordance with the present embodiment is mounted makes it possible to distinguish the state of the portable telephone terminal 1 at a glance, by making the designing effect given by the protective plate 5 different depending on the state of the portable telephone terminal 1.

Moreover, the display-protective plate for an electronic apparatus in accordance with the present embodiment may have a structure in which, in place of the metal thin film subjected to a tint treatment, the color half mirror layer 12 is made of a reflection-increasing film that has been tint-treated. That is, in this structure, the tint-treated reflection-increasing film and the transparent reflection-increasing film are used for sandwiching the polymer dispersion-type liquid crystal film 13 from the front side and the back side, respectively. Since no metal material is contained therein, this structure is desirably used for applications that call for an electric wave transmitting property in the protective plate. The structure and the forming method for the above-mentioned reflection-increasing film layer 20 may be applied to a reflection-increasing film for use in the color half mirror layer 12. Moreover, the tint treatment for the metal thin film may be applied to the tint treatment for the reflection-increasing film. Here, the reflection-increasing film for use in the color half mirror layer 12 is desirably designed to have such a film thickness that, although it conceals the display in the light-off state, it allows a screen display in a light display state to transmit. Moreover, the reflection-increasing film to be used for the color half mirror layer 12 is preferably formed so as to have a light transmittance in a range of from 60 to 80%.

Figure 7:
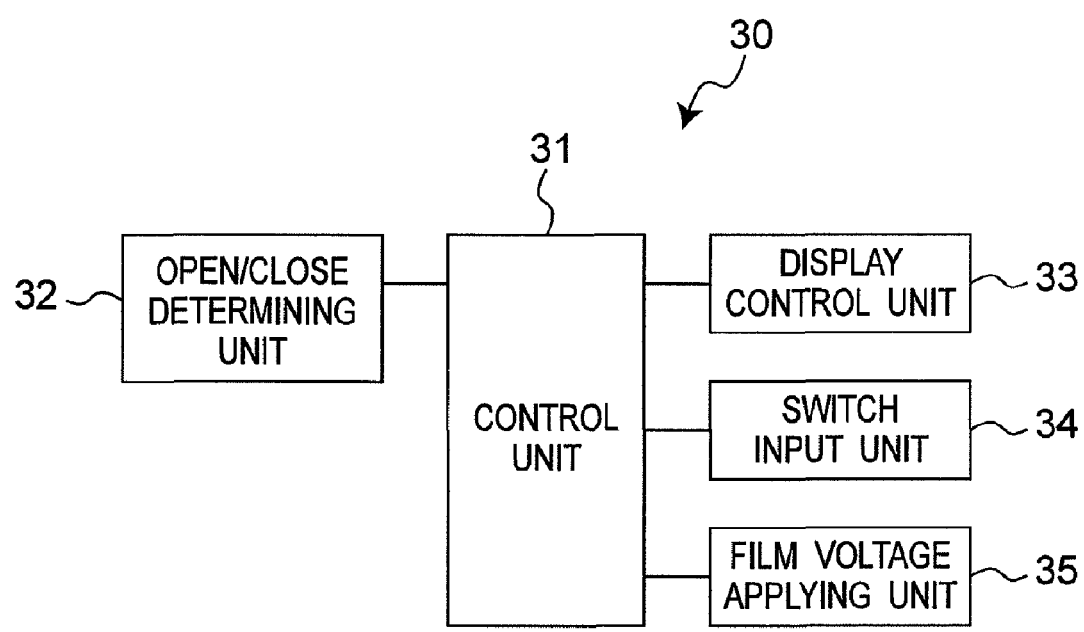
FIG. 7 is a functional block diagram showing a portable telephone terminal, in which attention is focused on the function of the display-protective plate of the portable telephone terminal of FIG. 1 for making changes in designing.

FIG. 7 is a functional block diagram showing a portable telephone terminal, in which attention is focused on the function of the display-protective plate of the portable telephone terminal of FIG. 1 for making changes in designing. This control system 30 includes a control unit 31 for determining the state of the portable telephone terminal 1 based upon detection signals from various functional blocks explained below, and managing the entire control operations, an open/close determining unit 32 used for determining the open/close state of the upper-side main body, a display control unit 33 for controlling the display/non-display state of the liquid crystal display panel 8, a switch input unit 34 for detecting whether or not an input through the operation buttons 6 of the lower-side main body 3 is given, and a film voltage applying unit 35 for controlling a voltage to be applied to the polymer dispersion-type liquid crystal film 13. The control unit 31 determines the state of the portable telephone terminal 1 based upon detection signals from the open/close determining unit 32 and the switch input unit 34, and controls the conditions of the display control unit 33 and the film voltage applying unit 35.

As shown in Tables 1 and 2, the portable telephone terminal varies the design of the display-protective plate depending on the states of the portable telephone terminal. The design of the display-protective plate is varied depending on the stand-by state, the power-off state, and the display state. Here, Table 1 shows how the electronic apparatus looks when both of the hues that are exhibited by the reflection-increasing film layer and the half color mirror layer are similar bluish colors, and Table 2 shows how the electronic apparatus looks when the hues that are exhibited by the reflection-increasing film layer and the half color mirror layer are a blue color and an orange color, which are respectively different.

TABLE 1

| State | Power-Off | Stand-by state | Display state |
|---|---|---|---|
| Reflection-increasing film layer | Blue | Blue | Blue |
| Half mirror layer | Metallic color with faint blue color reflection | Transmitted | Transmitted |
| Liquid crystal film | Clouded | Transparent | Transparent |
| Display | Off | Dark or off | Light |
| Appearance of panel | Faint blue-color mirror | Bluish black-color mirror | Screen display of bluish black-color mirror |
| Example of appearance | FIG. 3A | FIG. 3B | FIG. 3C |

TABLE 2

| State | Power-Off | Stand-by state | Display state |
|---|---|---|---|
| Reflection-increasing film layer | Blue | Blue | Blue |
| Half mirror layer | Metallic color with faint orange color reflection | Transmitted | Transmitted |
| Liquid crystal film | Clouded | Transparent | Transparent |
| Display | Off | Dark or off | Light |
| Appearance of panel | Faint orange-color mirror | Blue-color mirror | Screen display of blue-color mirror |
| Example of appearance | FIG. 3A | FIG. 3B | FIG. 3C |

As shown in Tables 1 and 2, in the power-off state of the power supply, the entire portion shown in FIG. 3A is brought into a state with mirror-like reflection gloss by the color half mirror layer 12. At this time, the display is set in the power-off state by the display control unit 33, and since a clouded un-transmitting mode is formed with no voltage being applied to the polymer dispersion-type liquid crystal film 13 so that the display is concealed, the panel appearance exhibits the color of the color half mirror layer 12.

In the stand-by state, the entire appearance, as shown in FIG. 3B, exhibits a mirror mode with a color exerted by the reflection-increasing film. In the stand-by state, the power supply of the portable telephone terminal 1 is on, with no input being given through the switch input unit 34 for a predetermined period of time. In this state, the polymer dispersion-type liquid crystal film 13 becomes transparent, with a voltage being applied thereto by the film voltage applying unit 35, the entire panel exhibits the mirror color of the reflection-increasing film by the reflection-increasing film layer 20 and a black-based half mirror 21 of the backing layer 14. In the case when the color half mirror layer 12 and the reflection-increasing film layer 20 have colors of the same type, as shown in Table 1, a color closer to the color of the reflection-increasing film layer 20 is exhibited. In contrast, in the case when the color half mirror layer 12 and the reflection-increasing film layer 20 have colors of different types, as shown in Table 2, a mixed color thereof is exhibited. Moreover, the liquid crystal display 4 is in a dark displayed state or in a light-off state, and can be visually recognized very faintly.

In the displayed state, the display 4 is allowed to display a mirror color of the reflection-increasing film, as shown in FIG. 3C. The display state is switched upon detection of the open state of the upper-side main body by the open/close determining unit 32 or upon detection of a switch input through the switch input unit 34, in the stand-by state. In the display state, the polymer dispersion-type liquid crystal film 13 becomes transparent, with a voltage being applied thereto by the film voltage applying unit 35, the entire panel exhibits the mirror color of the reflection-increasing film by the black-based backing layer 14. Moreover, the liquid crystal display 4 is in a light display state, and the liquid crystal display can be visually recognized on the background of the mirror color of the reflection-increasing film.

As described above, in the portable telephone terminal in accordance with the present embodiment, by controlling the display modes of the display and the voltage applied to the liquid crystal film, depending on the state of the portable telephone, the background color of the color half mirror is made different so that it is possible to make the designing effect of the protective plate different.

By properly combining the arbitrary embodiments of the aforementioned various embodiments, the effects possessed by the embodiments can be produced.

INDUSTRIAL APPLICABILITY

The display-protective plate for an electronic apparatus in accordance with the present invention makes it possible to protect a display to be used in many electronic apparatuses, and also to improve the designing effect of the electronic apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A display-protective plate for an electronic apparatus, which is attached to a case of an electronic apparatus to be used, and protects a display surface of a display that is attached to the case so as to be exposed from the case of the electronic apparatus, comprising:
    a plate-shaped transparent base member;
    a color half mirror layer that is placed on a lower side of the transparent base member, and made of a tint-treated metal thin film;
    a transparency-switching film that is placed on a lower face of the color half mirror layer, for switching between transmitting and non-transmitting modes electrically;
    a transparent reflection-increasing film layer that is placed on a lower face of the transparency-switching film, and is a composite film formed by alternately laminating high refractive-index films and low refractive-index films; and
    a backing layer that is formed on a lower face of the reflection-increasing film layer in a tight contact state without having an air layer interposed therebetween, the backing layer being located on a portion except for an exposed portion of the display, which are successively laminated.

2. The display-protective plate for an electronic apparatus according to claim 1, wherein the transparency-switching film is formed by a polymer dispersion-type liquid crystal film and adapted to be capable of switching between transparent and white non-transparent modes upon application of a voltage.

3. The display-protective plate for an electronic apparatus according to claim 2, wherein the transparency-switching film becomes the white non-transparent mode when a voltage is applied thereto, and becomes the transparent mode when no voltage is applied thereto.

4. The display-protective plate for an electronic apparatus according to claim 1, wherein the reflection-increasing film layer is made of a layer on which a dielectric film made from a transparent inorganic oxide is laminated.

5. The display-protective plate for an electronic apparatus according to claim 1, wherein, in place of the tint-treated metal thin film, the color half mirror layer is made of another tint-treated reflection-increasing film.

6. The display-protective plate for an electronic apparatus according to claim 1, wherein the color half mirror layer is placed on a surface of a transparent film, and formed by bonding the transparent film and the transparent base member to each other, with a surface of the film on which the color half mirror layer is not formed being made tightly in contact with a surface of the transparent base member.

7. The display-protective plate for an electronic apparatus according to claim 1, wherein the backing layer is made of a black solid pattern.

8. An electronic apparatus having a case with a surface to which the display-protective plate according to claim 1 is attached, comprising:
    a film-state switching unit for switching between the transmitting and non-transmitting modes of the transparency-switching film;
    a display control unit for controlling a display state of the display; and
    a main control unit for making operations of the display control unit and the film-state switching unit different depending on a state of the electronic apparatus,
    wherein the protective plate is allowed to have a different design depending on a state of the electronic apparatus.

* * * * *